United States Patent [19]

Konishi

[11] Patent Number: 5,235,608
[45] Date of Patent: Aug. 10, 1993

[54] GAS LASER APPARATUS

[75] Inventor: Takayoshi Konishi, Tokyo, Japan

[73] Assignee: NEC Corporation, Tokyo, Japan

[21] Appl. No.: 952,109

[22] Filed: Sep. 28, 1992

[30] Foreign Application Priority Data

Sep. 27, 1991 [JP] Japan .................................. 3-248590

[51] Int. Cl.⁵ .......................................... H01S 3/00
[52] U.S. Cl. ........................................... 372/37; 372/61
[58] Field of Search ...................................... 372/37, 61

[56] References Cited

U.S. PATENT DOCUMENTS 3,993,965 11/1976 Alves et al. ............................ 372/37
4,912,719 5/1990 Kanamoto et al. ................... 372/61

Primary Examiner—John D. Lee
Assistant Examiner—Robert E. Wise

[57] ABSTRACT

In a gas laser apparatus including a gas laser tube having a plasma tube between a cathode electrode and an anode electrode, and a magnetic field generator for generating a magnetic field through the central hole of said plasma tube, the radius of the central hole is configured so as to avoid ion bombardment by confining the ionized plasma within the magnetic flux passing through the cathode electrode. For practical purposes the central hole is tapered, at least near the entrance thereof, with its radius larger than that of the magnetic flux entering the central hole, thereby substantially eliminating sputtering by ion plasma at the entrance end and on the inner wall of the plasma tube.

4 Claims, 3 Drawing Sheets

GAS LASER APPARATUS

FIELD OF THE INVENTION

The invention relates to a gas laser apparatus.

BACKGROUND OF THE INVENTION

A typical gas laser as shown in FIG. 1 has a pair of opposing mirrors 10 aligned to their common optical axis (which mirrors will be hereinafter referred to as optical resonator), a gas laser tube 1 mounted in the optical resonator and containing a gas such as Argon, and an electromagnetic coil 5 for generating a magnetic field through the length of the laser tube 1.

Mounted inside the gas laser tube 1 are a plasma tube 2 having a central hole 2h, and a pair of a cathode electrode 3 and an anode electrode 4 at the opposite sides of the plasma tube. The plasma tube 2 is often divided into a multiplicity of smaller pieces which are coaxially spaced apart along their common center line.

When a current is passed from the anode electrode to the cathode electrode, gas discharge takes place, generating gaseous ions or plasma between them. In order to confine the plasma within the central hole 2h of the plasma tube 2, the electromagnetic coil 5 is impressed with a voltage to generate a magnetic field oriented generally along the center line of the central hole. By means of gas discharge, the ion plasma is continuously stimulated, creating inverted population distribution over laser transition levels and by means of optical resonator, induced laser emission is amplified.

In such gas lasers, a portion of ions accelerated by the impressed electric field between the electrodes bombard the entrance end and the inner wall of the capillary tube, and can erode the entrance end and the wall due to sputtering. Such sputtering, therefore, disadvantageously shorten life of the laser tube.

SUMMARY OF THE INVENTION

Therefore, an object of the invention is to provide an improved laser tube subject to only negligible sputtering by plasma at the entrance end and on the wall of the laser tube and thus having improved durability of the tube.

In one aspect of the invention, there is provided a gas laser apparatus including a gas laser tube having a plasma tube between a cathode electrode and an anode electrode, and a magnetic field generator for generating a magnetic field through the central hole of said plasma tube, characterized in that the radius of said central hole at any given point along the center line of said central hole is greater than the radius R of magnetic flux density B, defined by $$R = Rc \sqrt{Bc/B}$$

where Rc is the radius of a circle circumscribing the cathode end opposing said plasma tube, Bc is the magnetic flux density at the center of said circumcircle, and B is the magnetic flux density at said given axial point.

This arrangement may reduce sputtering by the ion plasma on the entrance and the wall of the capillary tube and provide durability of the laser tube.

In another aspect of the invention, there is provided a gas laser apparatus including a gas laser tube having a plasma tube between a cathode electrode and an anode electrode, and a magnetic field generator for generating a magnetic field through the central hole of said plasma tube, characterized in that the radius of the entrance of said central hole (facing said cathode electrode) is larger than the radius R of magnetic flux, defined by $$R = Rc \sqrt{Bc/B}$$

where Rc is the radius of a circle circumscribing the cathode end opposing said plasma tube, Bc is the magnetic flux density at the center of said circumcircle, and B is the magnetic flux density at the center of said entrance of said central hole.

The laser apparatus having this type of plasma tube which is simple in design permits efficient elimination of plasma bombardment on the entrance and the wall of the plasma tube.

Still another aspect of the invention, there is provided a gas laser apparatus, wherein the plasma tube for use with either of the above apparatuses is divided into a multiplicity of pieces coaxially spaced apart along their common center line.

BRIEF DESCRIPTION OF THE DRAWINGS

In FIGS. 2-3, like or corresponding portions of the gas laser tubes are numbered the same throughout the drawings.

DETAILED DESCRIPTION OF THE PREFERRED EMBODIMENT

Figure 1:
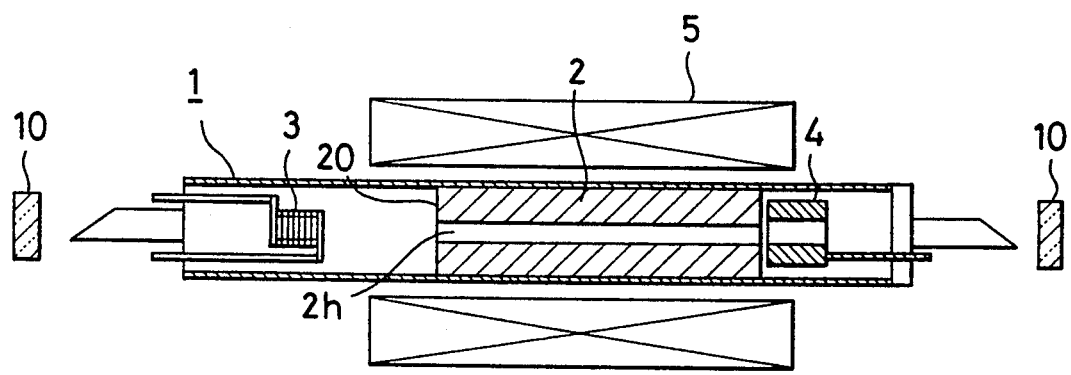
FIG. 1 is a schematic cross section of a conventional gas laser.
Figure 2:
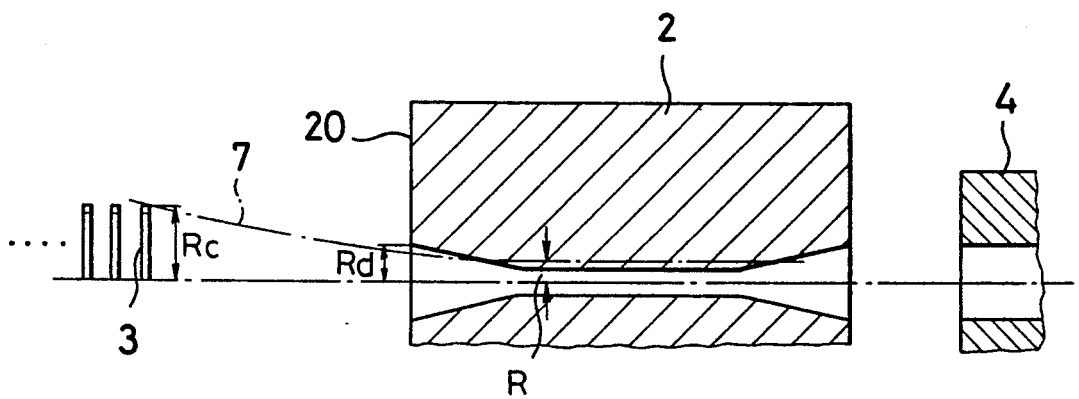
FIG. 2 is a schematic cross section of a first gas laser tube according to the invention.

FIG. 2 shows a cross section of a major portion of a first gas laser tube according to the invention. A plasma tube 2 is provided between a pair of cathode electrode 3 and an anode electrode 4, which are arranged between a pair of mirrors forming an optical resonator. The optical resonator may be installed either inside or outside the laser tube. The plasma tube has a first end 20 facing a cathode electrode 3 and a central hole 2h formed therethrough. The cathode electrode 3 has an end opposing the first end of the plasma tube 2 (said end referred to as cathode end). A magnetic flux outlined by magnetic field lines 7 passing through the circumcircle of the cathode end serves to confine ions accelerated toward the anode electrode. The entrance of the central hole facing the cathode electrode 3 is tapered in such a way that the radius Rd of the entrance is larger than the outer diameter of the magnetic flux entering the entrance.

More specifically, given the radius Rc of the circle circumscribing the cathode end, magnetic flux $\Phi c$ passing through the circumcircle is given by $$\Phi c = \pi Rc^2 Bc \qquad \text{Eq. (1)}$$

where Bc is the magnetic flux density at the center of the circumcircle. It should be noted that the radius R of the magnetic flux $\Phi$ at an arbitrary point along the center line of the central capillary is given by $$\Phi = \pi R^2 B \qquad \text{Eq. (2)}$$

where B is the magnetic flux density at the center line of the arbitrary point. By equating these two equations (1) and (2), the radius R is obtained as follows.

$$R = Rc \sqrt{Bc/B} \quad \text{Eq. (3)}$$

This equation may be interpreted as giving the radius of plasma flux confined in the magnetic flux passing through the circumcircle for the cathode electrode 3, since ionized particles in the plasma proceeds to the anode electrode substantially along the magnetic field lines.

By choosing larger than R given by Equation (3) the inner radius of the central hole $2h$ at any point along its center line, the magnetic field lines passing through the cathode electrode 3 will not penetrate the wall of the central hole of the plasma tube 2, thereby preventing sputtering by ion bombardment at the entrance end and on the wall of the plasma tube.

However, for substantial reduction of sputtering in the plasma tube, it is sufficient to make the radius of the central hole at the entrance larger than the radius of the magnetic flux at the entrance, and to taper the central hole only near the entrance, since a minor portion of the magnetic field lines crossing middle of the wall will not cause serious sputtering problems.

When an electric current is passed through between the cathode electrode 3 and the anode electrode 4, ionized plasma is generated between the electrodes and, under the influence of the magnetic field, confined in the magnetic flux passing through the electrodes, so that ions may pass through the central hole without any or with only negligible interference with the wall of the central hole.

Figure 3:
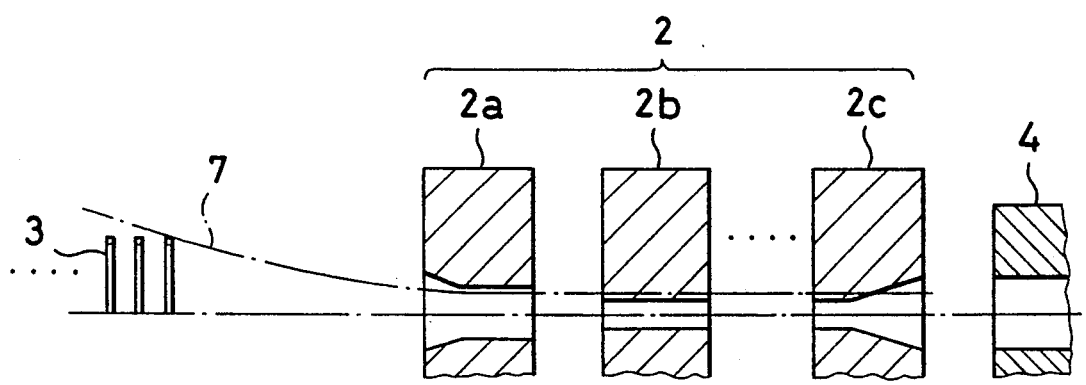
FIG. 3 is a schematic cross section of a second gas laser tube according to the invention.

The plasma tube described above in connection with FIG. 2 is a single continuous piece. However, the plasma tube may be substituted for by a multiplicity of shorter pieces $2a$, $2b$, through $2c$ coaxially spaced apart along their common center line, as shown in FIG. 3. The central hole formed in these pieces are tapered or configured so as to conform the longitudinal cross section of a single piece central hole discussed in relation to FIG. 2.

It is apparent that in this case also the outermost magnetic field lines passing through the circumcircle of the cathode end will not intersect the first end of the plasma tube, thereby preventing sputtering by the plasma on that first end and providing durability of the laser tube. In addition, the plasma tube tapered or configured in this manner may substantially eliminate sputtering on the wall of the central hole.

In summary, the invention may greatly suppress sputtering on the plasma tube by confining plasma within a given magnetic flux., said confinement based on an analysis of geometrical interrelationship between the cathode electrode and the plasma tube.

I claim:

1. A gas laser apparatus including a gas laser tube having a plasma tube between a cathode electrode and an anode electrode, and a magnetic field generator for generating a magnetic field through the central hole of said plasma tube, wherein the radius of said central hole at any given point along the center line of said central hole is greater than the radius R of magnetic flux B, defined by $$R = Rc \sqrt{Bc/B}$$

where Rc is the radius of a circle circumscribing the cathode end opposing said plasma tube, Bc is the magnetic flux at the center of said circumcircle, and B is the magnetic flux density at said given axial point.

2. A gas laser apparatus according to claim 1, wherein said capillary tube is divided into a multiplicity of pieces coaxially spaced apart along their common center line.

3. A gas laser apparatus including a gas laser tube having a plasma tube between a cathode electrode and an anode electrode, and a magnetic field generator for generating a magnetic field through a central hole of said plasma tube, wherein the radius of the entrance of said central hole facing said cathode electrode is larger than the radius R of magnetic flux density B, defined by $$R = Rc \sqrt{Bc/B}$$

where Rc is the radius of a circle circumscribing the cathode end opposing said plasma tube, Bc is the magnetic flux density at the center of said circle, and B is the magnetic flux density at said entrance of said central hole.

4. A gas laser apparatus according to claim 3, wherein said plasma tube is divided into a multiplicity of pieces coaxially spaced apart along their common center line.

* * * * *